Figure 1:
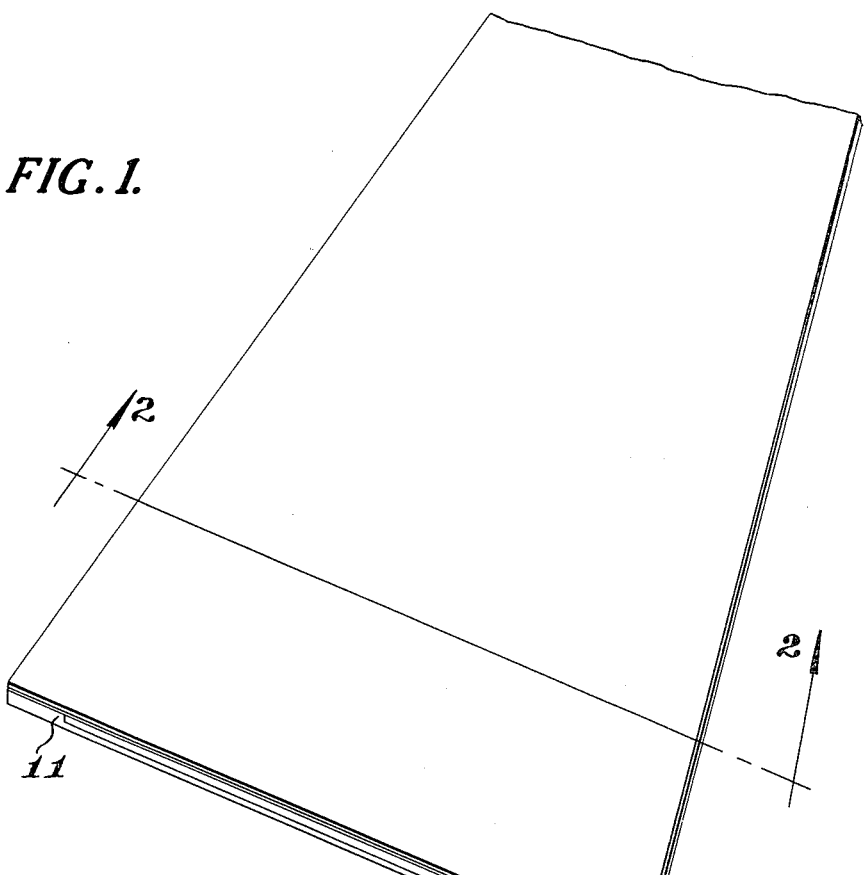

June 26, 1956 — G. B. COOKE ET AL — 2,752,280
PRINTER'S BLANKET AND METHOD OF MAKING SAME
Filed Feb. 2, 1953

INVENTOR
Giles B. Cooke
Mordecai N. Timbs
BY Cushman, Darby & Cushman
ATTORNEYS

United States Patent Office 2,752,280
Patented June 26, 1956

2,752,280

PRINTER'S BLANKET AND METHOD OF MAKING SAME

Giles B. Cooke and Mordecai N. Timbs, Baltimore, Md., assignors to Crown Cork & Seal Company, Inc., Baltimore, Md., a corporation of New York Application February 2, 1953, Serial No. 334,698

6 Claims. (Cl. 154—118)

This invention relates to novel printing blankets comprising a base, an intermediate resilient layer bonded to said base and an outer protective layer, said outer protective layer and said base completely encasing said intermediate resilient layer thereby protecting the latter from the deleterious effects of printing ink solutions.

It is well known that many printing inks have a deleterious effect on natural rubber. For example, when natural rubber is employed to make printing blankets, the surface soon becomes swelled under the action of the organic solvents of the ink and also deteriorates to such an extent that repeated impacts on the blanket form permanent depressions. Such undesirable embossing and engraving effects soon render the blanket useless for first-class printing.

These adverse effects have been quite prevalent when using such printing blankets, for example, in Gravure printing. Gravure inks contain organic solvents which dry more quickly than the conventional aniline printing inks. For this reason, extensive research has been conducted in an attempt to develop a printing blanket possessing characteristics that will overcome these problems and yet afford the beneficial properties of the natural rubber.

It has been proposed to make such blankets out of various types of synthetic rubber compositions which are more resistant to the action of printing inks than is natural rubber. It has been found, however, that many types of oil-resisting synthetic rubber compositions are not as flexible and resilient nor as readily wetted by the printing inks. Instead of spreading over the synthetic surfaces in a thin uniform film, the printing inks have a tendency to form in small droplets.

These synthetic compositions have also been used in conjunction with a natural rubber intermediate layer to impart the greater cushioning effect of natural rubber and other advantages such as excellent flexibility and resiliency that this latter material possesses. However, when these natural rubber intermediate layers were used with, for example, quick drying Gravure inks, the problem of deterioration which has been discussed heretofore still remained. Since the outer synthetic composition layer did not completely seal the natural rubber intermediate layer to the metal base, the exposed marginal edges of the said intermediate layer would still come in contact with the printing ink and tend to swell and disintegrate.

Accordingly, research attempts have been primarily aimed at the development of a new laminated printing blanket which would minimize the above disadvantages when printing blankets are used in all types of printing operations.

The primary object of the present invention is to provide a novel printing blanket comprising a base, an intermediate resilient layer bonded to said base and an outer protective layer, said outer protective layer and said base completely encasing said intermediate resilient layer thereby protecting the latter from the deleterious effects of printing inks.

Another object is the provision of a novel printing blanket comprising a metal base, an intermediate layer of compounded natural rubber bonded to said metal base and an outer layer of Thiokol composition wherein the intermediate layer of natural rubber is completely protected from exposure to deleterious printing inks by the base and outer layer.

A more specific object of the invention is to provide a novel printing blanket that comprises a metal base, an intermediate layer of compounded natural rubber bonded to said metal base and an outer layer of Thiokol composition wherein the Thiokol outer layer covers the lateral surface of the intermediate layer and is extended to form continuous marginal walls around the latter thereby completely protecting the said intermediate layer from exposure to deleterious printing inks.

Another and further object of this invention is to provide a novel printing blanket comprising a metal base, intermediate layer of compounded natural rubber, and an outer protective layer of Thiokol composition wherein the outer protective layer of Thiokol composition and the metal base extend laterally beyond said intermediate layer of natural rubber and are bonded together to form continuous marginal walls around said intermediate layer.

Still another object of our invention is to provide a novel method for making printing blankets which comprises bonding a compounded natural rubber layer on a metal base and covering this intermediate natural rubber layer both on its lateral surface and its marginal edges with a layer of Thiokol composition.

Still further objects and the entire scope of applicability of the present invention will become apparent from the detailed description given hereinafter. It should be understood, however, that the detailed description while indicating preferred embodiments of the invention, is given by way of illustration only, since various changes and modifications within the spirit and scope of the invention will become apparent to those skilled in the art from this detailed description.

Broadly, this new printing blanket comprises a metal base plate made preferably of brass, an intermediate layer of compounded natural rubber which is preferably compounded with a white filler, carbon black or other suitable filler and a surface layer composition comprising synthetic rubber, carbon black, stearic acid, zinc peroxide and an olefin polysulfide reactive product (Thiokol).

The base plate acts as a foundation on which to build the flexible surface. This base is later bonded to the printing cylinder so that the printing surface of Thiokol composition is exposed.

The intermediate layer, which ordinarily constitutes the major portion of the blanket, is a composition made of soft, vulcanized natural rubber, such as one of the following compounded rubbers:

*White natural rubber insert*

50.00 pts. RMA #1 Smoked Sheet Rubber
50.00 pts. talc
69.90 pts. clay
20.00 pts. ceresin wax
6.00 pts. Rayox ($TiO_2$)
2.50 pts. zinc oxide
1.00 pt. sulfur (rubber grade)
0.60 pt. Tetrone "A"

Black natural rubber insert 53.00 pts. RMA #1 Smoked Sheet Rubber
20.00 pts. Ruby Red (reclaimed rubber)
12.35 pts. guilders whiting
0.20 pt. ceresin wax
8.00 pts. micronex W-6
0.60 pt. stearic acid
0.25 pt. Thermoflex "A"
0.25 pt. Neozone "D"
0.15 pt. Retarder "W"
0.50 pt. zenite
0.10 pt. Accelerator #808
3.00 pts. zinc oxide
1.60 pts. sulfur (rubber grade)

Also, the conventional compounded natural rubber printing blanket material on the market is satisfactory in place of one of the above compositions.

With respect to the above listed compositions, it should be noted that Tetrone "A" is dipentamethylene thiuram tetrasulfide; Micronex W-6 is carbon black; Thermoflex A comprises 25% di-p-methoxy-diphenylamine, 25% diphenyl-p-phenylene-diamine and 50% phenyl-beta-naphthylamine; Neozone D is phenyl-beta-naphthylamine; Retarder W is salicylic acid; Zenite comprises 90% zinc salt of 2-mercaptobenzenothiazole and 10% inert wax; and Accelerator 808 is the product of butyraldehyde and aniline.

Substantial proportions of standard fillers, such as carbon black, may be incorporated in the composition. Of course, the principles underlying the make-up of this natural rubber composition are well understood by those skilled in the art of compounding rubber and any method for obtaining a low-set natural rubber intermediate body may be employed.

The surface of the printing blanket is composed of a layer of a composition in which Thiokol is included as an ingredient. This Thiokol composition can readily be prepared on the conventional rubber mill equipment and may be calendered to the deesired thickness on rubber mill calenders. We have found that a suitable Thiokol covering layer may be prepared from the following composition:

| | Parts |
|---|---|
| Thiokol PR-1 | 100 |
| Neoprene Type W | 25 |
| Carbon black | 45 |
| Stearic acid | 1 |
| Zinc peroxide | 6 |

The neoprene is first thoroughly milled and then the Thiokol is incorporated therewith. The other ingredients are added and thoroughly milled into the rubber mixture. A cool mill is used for all of these milling operations. The milled composition is then calendered to a predetermined thickness and is ready for use in the manufacture of printing blankets.

The proportions in which the various compounds are combined to form a suitable Thiokol outer layer depend upon several factors including the particular type of Thiokol utilized and the nature of the printing inks. In general, the governing factor is the resistance to swelling and deterioration that is required. In other words, the proportion of Thiokol is increased where increased solvent resistance is required.

The Thiokol outer layer should be supplied to a thickness sufficient to give complete protection against solvents throughout the life of the blanket. There are a number of types of Thiokol synthetic rubbers that can be used for such outer layer but their characteristics are generally quite similar and the factors governing utilization of the same which have been heretofore discussed are generally applicable thereto. Examples of the various Thiokol synthetic rubbers that can be used include Type ST, Type FA, Type PR-1 and other types. Chemically, the various types listed differ merely in the length of the olefin polysulfide polymer included therein. Likewise, instead of Neoprene Type W, other types of neoprene may be used, for example, types GN, GN-A, E, RT, and other suitable types. These compositions differ in their milling and compounding qualities but are all highly resistant to solvents.

Figure 2:
Figure 2:

The present invention will be more readily understood from the accompanying drawing which illustrates one embodiment thereof and wherein:

Figure 1 is a perspective view of a printing blanket, according to the invention, and Figure 2 is a cross sectional view thereof taken on the line 2—2 of Figure 1.

The figures show a metal base 3 bonded to an intermediate compounded natural rubber layer 9 by an adhesive material 5 such as a solvent rubber cement or a latex cement or any other suitable commercial adhesive, and an outer Thiokol composition layer 7. In this connection, we have found it highly satisfactory to impregnate a porous web, e. g., of paper, cloth or wire screen, with the adhesive. As set forth heretofore, the intermediate layer 9 of compounded natural rubber is completely encased by the metal base 3, the Thiokol composition layer 7 and the continuous marginal walls 11 forming a part of said Thiokol composition layer 7. No adhesive is used between the outer protective Thiokol layer and the intermediate resilient natural rubber layer, these being cured into a single unit. However, the marginal walls 11 of the Thiokol layer and the metal base 3 are bonded by the adhesive 5 to unite their respective opposed surfaces.

The resulting printing blanket is of high organic solvent resistance and the combination of natural rubber and Thiokol provides the advantages listed heretofore resulting in printing of greatly enhanced quality. These beneficial results are attained without the detrimental effects which would result if any part of the natural rubber intermediate layer was allowed to contact the printing inks.

The following detailed procedure of manufacturing a printer's blanket such as is illustrated in the accompanying drawing is included merely as a further example of carrying out the present invention but without intention of limiting the same.

The metal base may be of any standard non-corrosive composition and preferably of brass. The intermediate layer of natural rubber composition is spread on the metal base and is bonded to it by a cement composition. Strips of Thiokol composition which are placed so as to cover the exposed lateral surface and marginal ends of the intermediate layer are then bonded thereto. A further layer of Thiokol compound may also be placed over this laminated structure. Curing and embossing are then carried out in the usual manner. These curing and embossing principles are well understood by those skilled in the art but the following brief procedure is set forth to indicate, in general terms, curing methods that might be utilized. The blanket may be cured in a press, in steam or air. In a press, the blanket is preferably vulcanized for about 10 to 15 minutes at 300° F. wherein embossing is coincidentally carried out. Preferably, a hydraulic press is used and the embossing and curing is a two-stage operation. When materials have been properly placed in the press, the press is closed and held under pressure for about one minute. The pressure is then released in order to allow any formed gases to escape, and then the press is closed and held under pressure for the ten minute curing period.

It is essential that the outer layer and metal base completely encase the natural rubber intermediate layer. This is the unique feature that primarily yields the greatly enhanced results discussed heretofore. It can be appreciated that if there remained an exposed section of the natural rubber layer, as in the edges of an ordinary printer's blanket, the organic solvent material in the printing ink would come in contact with the natural rubber layer through the edges and tend to disintegrate the same.

Conclusions

By our novel development we have succeeded in imparting the beneficial cushioning and flexibility of natural rubber to a printing blanket without subjecting the latter to the destructive effect that the presence of such natural rubber normally would have.

Of course, it should be noted that although Thiokol compounds have been indicated to be preferable as the material forming the outer protective layer, any other rubber-like compound possessing the necessary protective properties could also be used in our invention and would accomplish the same desirable results.

While we have illustrated and described a printer's blanket comprising a base, e. g., a metal base, an intermediate, resilient layer of compounded natural rubber bonded to the base and an outer protective layer comprising synthetic rubber composition, in some cases the base may be omitted and the blanket will then comprise the resilient layer of compounded natural rubber 9 and the synthetic composition layer 7, the two layers being bonded together into an integral structure by curing of the same, as above described. Such a blanket may be readily applied to a printing cylinder in a conventional manner, e. g., by means of a suitable adhesive. Aside from the omission of the metal base 3, the construction is otherwise similar to that shown in Figures 1 and 2 of the drawing.

While we have referred herein to the use of compounded natural rubber compositions to form the layer 9 of the printing blanket, it is to be understood that where compounded natural rubber compositions are not available or are not desired, there may be used in place of the compounded natural rubber, compounded synthetic rubber compositions including, for example, Buna S, which is a rubbery copolymer of butadiene 1,3 and styrene.

The novel principles of this invention are broader than the specific embodiments recited above and rather than unduly extend this disclosure by attempting to list all the numerous modifications which have been conceived and reduced to practice during the course of this development, these novel features are defined in the following claims.

We claim:

1. A printer's blanket comprising a metal base, an intermediate resilient layer of natural rubber bonded to said metal base and an outer protective layer comprising synthetic rubber, carbon black, stearic acid, zinc peroxide and an olefin polysulfide reactive product, said outer protective layer and said base completely encasing said intermediate resilient layer thereby protecting the latter from the deleterious effects of printing ink solutions.

2. The blanket of claim 1 wherein carbon black is included in the natural rubber intermediate layer.

3. The blanket of claim 1 wherein the metal base is brass.

4. A method of making a printer's blanket which comprises positioning a natural rubber layer over a base layer, the base layer having a larger surface area to thereby extend laterally beyond the marginal edges of said intermediate rubber layer, bonding said intermediate rubber layer to said base layer, positioning an outer protective layer of a composition which includes an olefin polysulfide reactive product over said natural rubber layer, said outer layer also having a larger surface area than the intermediate layer to thereby extend laterally beyond the marginal edges of said intermediate layer, and thereafter bonding the extended portions of said base layer and outer protective layer to thereby completely encase the natural rubber layer and protect the latter from the deleterious effects of printing ink solutions.

5. A method of making a printer's blanket as claimed in claim 4 wherein said base layer is metal.

6. A printer's blanket comprising a resilient layer and an outer protective layer, said outer protective layer enclosing said resilient layer on one surface and having marginal walls enclosing the edges of said resilient layer, said resilient layer being formed of compounded natural rubber and said outer protective layer comprising synthetic rubber, carbon black, stearic acid, zinc peroxide and an olefin polysulfide reaction product.

References Cited in the file of this patent

UNITED STATES PATENTS

| | | |
|---|---|---|
| 1,810,089 | Schmutz | June 16, 1931 |
| 2,026,272 | Danser | Dec. 31, 1935 |
| 2,048,841 | Coyne | July 28, 1936 |
| 2,112,544 | Rice | Mar. 29, 1938 |
| 2,643,206 | Ford | June 23, 1953 |

FOREIGN PATENTS

| | | |
|---|---|---|
| 21,711 | Great Britain | 1906 |
| 427,337 | Great Britain | Apr. 23, 1935 |